US010698733B1

(12) United States Patent
Lee et al.

(10) Patent No.: US 10,698,733 B1
(45) Date of Patent: Jun. 30, 2020

(54) INTEGRATED SYSTEM TO DISTRIBUTE AND EXECUTE COMPLEX APPLICATIONS

(71) Applicant: INTUIT INC., Mountain View, CA (US)

(72) Inventors: Edward K. Lee, Sunnyvale, CA (US); Hong Wang, San Jose, CA (US); Ying Xie, Cupertino, CA (US); Zheng Yang, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 166 days.

(21) Appl. No.: 15/943,562

(22) Filed: Apr. 2, 2018

Related U.S. Application Data

(63) Continuation-in-part of application No. 15/695,322, filed on Sep. 5, 2017, now Pat. No. 10,528,367.

(60) Provisional application No. 62/482,636, filed on Apr. 6, 2017, provisional application No. 62/383,232, filed on Sep. 2, 2016.

(51) Int. Cl.
G06F 9/46 (2006.01)
G06F 9/50 (2006.01)
G06F 9/48 (2006.01)
G06F 9/445 (2018.01)
G06F 8/60 (2018.01)
G06F 8/70 (2018.01)
H04L 29/08 (2006.01)

(52) U.S. Cl.
CPC .............. G06F 9/5038 (2013.01); G06F 8/60 (2013.01); G06F 8/70 (2013.01); G06F 9/44505 (2013.01); G06F 9/44584 (2013.01); G06F 9/4881 (2013.01); H04L 67/10 (2013.01)

(58) Field of Classification Search
None
See application file for complete search history.

(56) References Cited

U.S. PATENT DOCUMENTS

| 7,739,243 | B2* | 6/2010 | Erickson | G06F 9/44505 707/681 |
| 8,464,213 | B1* | 6/2013 | Stienstra | G06F 9/4492 717/107 |
| 9,063,823 | B2* | 6/2015 | Imrey | G06Q 10/10 |
| 9,201,632 | B2* | 12/2015 | Somani | G06F 8/30 |
| 9,477,522 | B2* | 10/2016 | Harper | G06F 9/4881 |
| 9,524,192 | B2* | 12/2016 | van Velzen | G06F 9/5038 |
| 9,557,988 | B2* | 1/2017 | Binjrajka | G06F 8/71 |
| 9,696,971 | B1* | 7/2017 | Wierda | G06F 8/41 |
| 9,830,135 | B2* | 11/2017 | Tripathi | G06F 8/60 |
| 9,904,585 | B1* | 2/2018 | Islam | G06F 11/079 |
| 9,946,517 | B2* | 4/2018 | Talby | G06F 8/35 |
| 10,282,175 | B2* | 5/2019 | Busjaeger | G06F 8/70 |

(Continued)

OTHER PUBLICATIONS

IEEE Cloud Computing; "Cloud Tidbits Column", IEEE, Sep. 2014 (Google_Kubernetes_2014.pdf; pp. 81-84) (Year: 2014).*

(Continued)

Primary Examiner — Hiren P Patel
(74) Attorney, Agent, or Firm — Patterson + Sheridan LLP

(57) ABSTRACT

An execution platform comprising a workflow engine and an application engine is provided. A workflow definition associated with an application is received. The workflow definition is used to run an application workflow to perform an action with respect to the application, at least in part by causing an executable binary to be run by the application engine.

24 Claims, 8 Drawing Sheets

(56) References Cited

U.S. PATENT DOCUMENTS

| | | | |
|---|---|---|---|
| 2003/0023472 A1* | 1/2003 | Lee | G06F 9/5038 709/226 |
| 2005/0149908 A1* | 7/2005 | Klianev | G06F 8/34 717/109 |
| 2006/0015873 A1* | 1/2006 | Dettinger | G06F 9/5038 718/102 |
| 2006/0048094 A1* | 3/2006 | Kipman | G06Q 10/06 717/104 |
| 2006/0212857 A1* | 9/2006 | Neumann | G06F 8/20 717/140 |
| 2008/0229306 A1* | 9/2008 | Omori | G06F 9/5038 718/100 |
| 2009/0055825 A1* | 2/2009 | Smith | G06Q 10/00 718/102 |
| 2010/0023950 A1* | 1/2010 | Fujii | G06F 9/5038 718/105 |
| 2010/0240449 A1* | 9/2010 | Corem | H04L 67/104 463/29 |
| 2014/0067804 A1* | 3/2014 | Yoshizawa | G06F 16/284 707/736 |
| 2014/0123110 A1* | 5/2014 | Wan | G06F 11/3672 717/124 |
| 2014/0282450 A1* | 9/2014 | Jubran | G06F 8/443 717/151 |
| 2015/0067687 A1* | 3/2015 | Turner | G06F 9/4881 718/102 |
| 2015/0100945 A1* | 4/2015 | Nadar | G06F 8/40 717/121 |
| 2016/0105487 A1* | 4/2016 | Chandra | G06F 9/5038 709/203 |
| 2016/0124742 A1* | 5/2016 | Rangasamy | H04L 47/70 717/103 |
| 2016/0147529 A1* | 5/2016 | Coleman | G06F 8/63 717/120 |
| 2016/0202959 A1* | 7/2016 | Doubleday | G06F 8/71 717/107 |
| 2016/0239275 A1* | 8/2016 | Singh | G06F 8/41 |
| 2017/0097814 A1* | 4/2017 | Norskov | G06F 8/447 |
| 2017/0249141 A1* | 8/2017 | Parees | G06F 11/3668 |
| 2017/0346683 A1* | 11/2017 | Li | H04L 41/0803 |
| 2018/0253296 A1* | 9/2018 | Brebner | G06F 15/16 |

OTHER PUBLICATIONS

Baranowski et al., "Constructing workflows from script applications", Scientific Programming 20 (2012/2013), IOS press (Baranowski_2012.pdf; pp. 359-377) (Year: 2013).*

Adrien Devresse et al.; "Nix based fully automated workflows and ecosystem to guarantee scientific result reproducibility across software environments and systems"; 2015 ACM; (Devresse_2015.pdf; pp. 1-7) (Year: 2015).*

Claus Pahl et al; "Containers and Clusters for Edge Cloud Architectures—a Technology Review"; 2015 IEEE; (Pahl_2015.pdf; pp. 1-8) (Year: 2015).*

* cited by examiner

US 10,698,733 B1

INTEGRATED SYSTEM TO DISTRIBUTE AND EXECUTE COMPLEX APPLICATIONS

CROSS REFERENCE TO OTHER APPLICATIONS

This application claims priority to U.S. Provisional Patent Application Ser. No. 62/482,636 entitled INTEGRATED SYSTEM TO DISTRIBUTE AND EXECUTE COMPLEX APPLICATIONS filed Apr. 6, 2017 which is incorporated herein by reference for all purposes.

This application is a continuation in part of co-pending U.S. patent application Ser. No. 15/695,322, entitled EXECUTION OF WORKFLOWS IN DISTRIBUTED SYSTEMS, filed Sep. 5, 2017, which claims priority to U.S. Patent Application No. 62/383,232, entitled EXECUTION OF WORKFLOWS IN DISTRIBUTED SYSTEMS, filed Sep. 2, 2016, both of which are incorporated herein by reference for all purposes.

BACKGROUND OF THE INVENTION

Deployment and lifecycle management of complex computing systems is challenging, and should be run as efficiently as possible to conserve time and financial resources, while preserving portability and reducing operator error.

BRIEF DESCRIPTION OF THE DRAWINGS

Various embodiments of the invention are disclosed in the following detailed description and the accompanying drawings.

DETAILED DESCRIPTION

Figure 1:
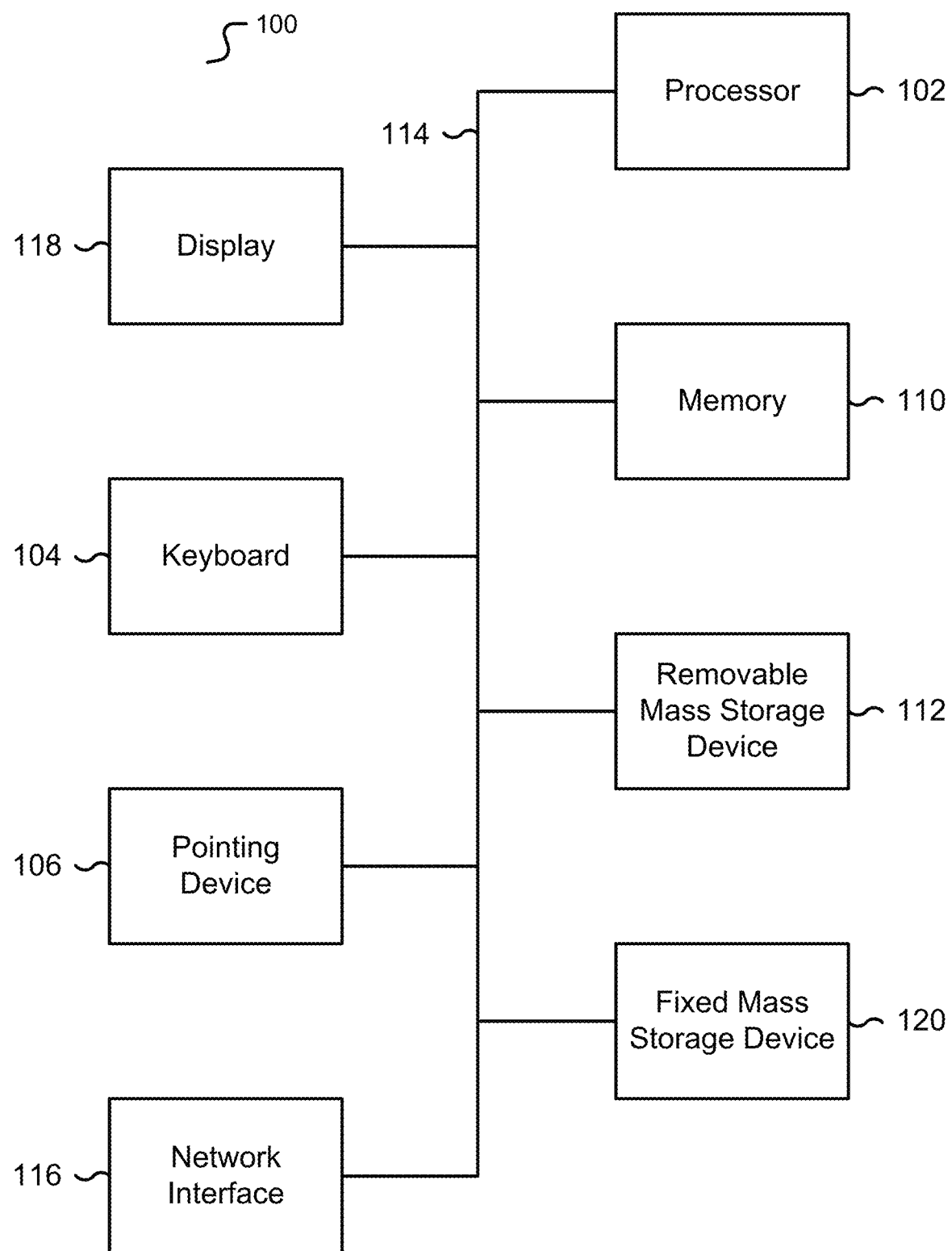
FIG. 1 is a functional diagram illustrating a programmed computer/server system for simple, flexible packaging, distribution and reliable, consistent execution of complex applications with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An integrated system for simple, flexible packaging, distribution and reliable, consistent execution of complex applications, which preserves portability across multiple computing environments, is disclosed. A complex application may comprise multiple executable components and may require auxiliary workflows for effective use and management of the application. A "distributed system" as referred to herein includes any system that has an application and/or microservice running on a plurality of computing entities, containers, nodes, virtual machines, and/or physical machines. The term "distributed application" is used herein to describe a class of complex applications to run on a distributed system, for example a containerized application running on a plurality of containers. A "container" and/or "container instance" is referred to herein as a program that runs in an isolated environment from other programs, for example a Docker container and/or LxC Linux container, which provides portability for a simple application. An "orchestration framework" is referred to herein as a framework for orchestration, scaling, and/or scheduling of containers, for example Kubernetes, Mesos, and/or Docker Swarm. A "workflow" is referred to herein as a high-level program for orchestrating and performing actions related to the application.

Using workflows specified in a portable manner using YAML and/or tightly integrating a workflow engine with an application engine, artifact management, and/or a configuration database is disclosed. By improving the portability of a distributed application and associated lifecycle management workflows, flexibility and system operating efficiency will be improved, operator error will be reduced, and resource costs for storage/computing cycles/network bandwidth will be reduced.

FIG. 1 is a functional diagram illustrating a programmed computer/server system for simple, flexible packaging, distribution and reliable, consistent execution of complex applications with some embodiments. As shown, FIG. 1 provides a functional diagram of a general purpose computer system programmed for simple, flexible packaging, distribution and reliable, consistent execution of complex applications with some embodiments. As will be apparent, other computer system architectures and configurations may be used for simple, flexible packaging, distribution and reliable, consistent execution of complex applications.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118. In one embodiment, server systems may not generally have a physical display, keyboard, and/or mouse attached physically.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio recording device, audio card, speakers, a touch (or pointing) device, and/or other subsystems as needed. Besides a touch screen and/or capacitive touch interface, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Express-card, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems may also be utilized. Other environments may also be utilized, for example virtualized environments including without limitation: hardware-level virtualization such as a virtual machine (VM) such as a VMWare VM, operating-system level virtualization such as a Docker container and/or LxC Linux container, application-level virtualization, workspace-level virtualization, and/or service virtualization.

Workflow definitions associated with a set of workflows may be used, for example to implement a state machine of an application, as described in U.S. patent application Ser. No. 15/695,322 entitled EXECUTION OF WORKFLOWS IN DISTRIBUTED SYSTEMS filed Sep. 5, 2017 which is incorporated herein by reference for all purposes. In one embodiment, a workflow designer may be constrained to express their designed workflow in a stylized and/or restrictive fashion, such as a declarative definition, rather than an imperative definition to foster efficiencies as described in U.S. patent application Ser. No. 15/695,322. In one embodiment, workflows are defined in YAML as a DSL (domain specific language). The workflow definitions are used in part to recognize if a common step exists between two or more workflows.

In one embodiment, a declarative workflow definition is mapped to a state machine representing the entire set of workflows. Steps in each workflow may be sequential and/or parallel. Data may be generated by a given step and consumed by a subsequent step, and this data is referred to herein as an "artifact". Artifacts may be consumed by other steps in a workflow and/or stored persistently for future use. In one embodiment, each artifact and each step in a workflow may be identified by a content-based fingerprint, for example a hash. Data with the same content will have the same hash. Steps that perform the same operation may also have the same hash. For efficiency, the results at each point in a given workflow may be identified by a "cache hash", referred to herein as a function of the hash of the input data and the hashes of the steps that have been performed up to that point. Note that the hashes of intermediate artifacts may not be needed to generate the cache hash.

The disclosed techniques are applicable to any workflow environment, for example that of data streams or logical execution plans in data lineage such as that in Apache™ Spark, and/or workflows in distributed systems such as that in Jenkins™ Pipeline, Apache Airflow, and/or adhoc scripts. Without limitation an example for execution of workflows in distributed systems is described in detail. A distributed system comprises components that may independently fail and recover and where the components communicate with each other over communication channels that may not be completely reliable.

The modern use of containers, with operating-system virtualization, has made efficient deploying microservices, scalable distributed applications comprising multiple tiers of components, for example a simple three-tier web application may include three tiers of components: a front-end code, a business logic, and a back-end database. With distributed systems, software runs on multiple servers in different container/virtual machine/physical machine locations. Using declarative workflow definitions gives an inherent flexibility in how to accomplish a given step, and generally forces a designer to describe the step in a repeatable way.

Figure 2:
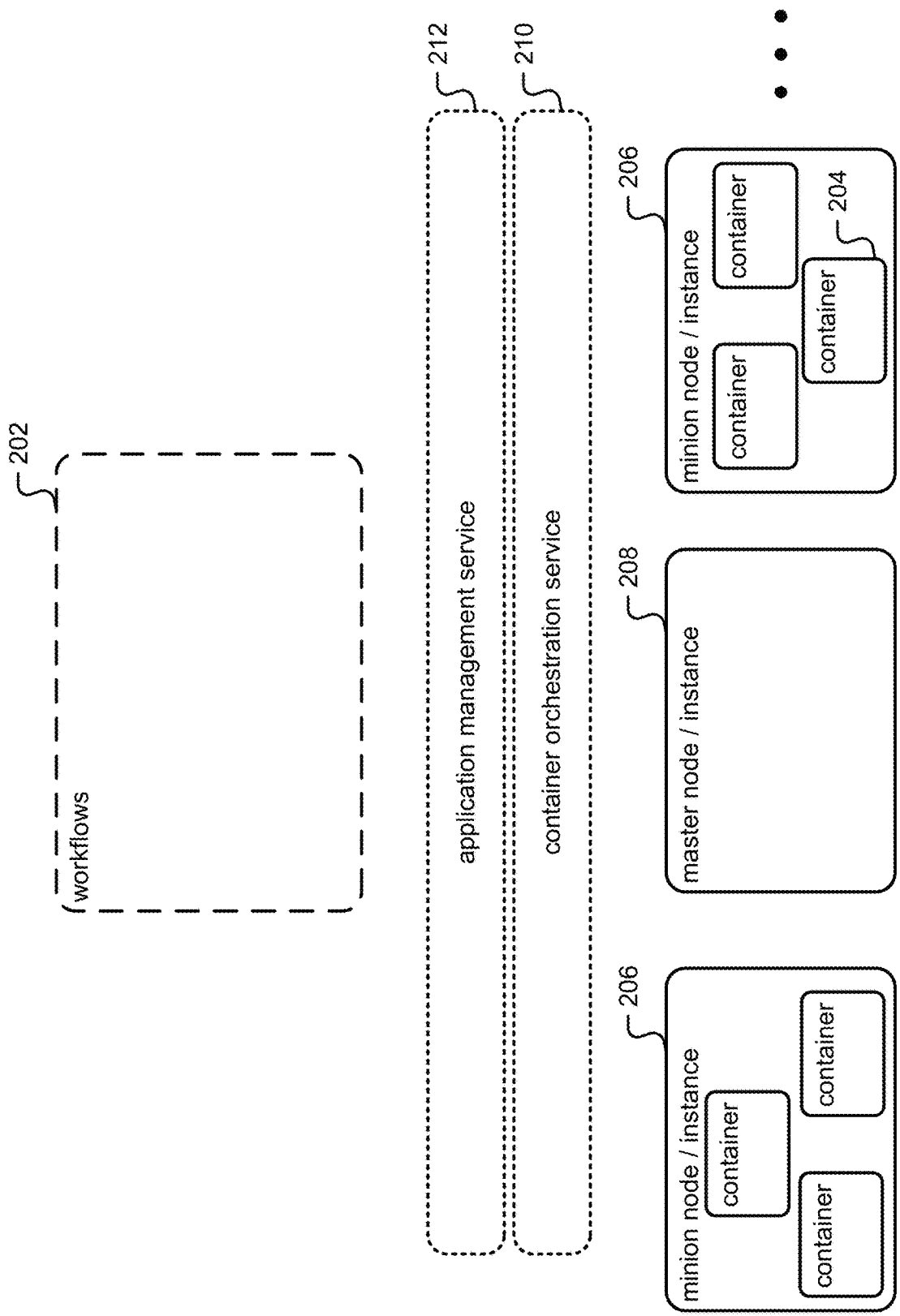
FIG. 2 is a block diagram illustrating an embodiment of a system for workflow execution.

FIG. 2 is a block diagram illustrating an embodiment of a system for workflow execution. Workflows (202) associated with a distributed application are run on a plurality of containers (204). One or more containers (204) are virtualized within a single "minion" or node (206) worker machine, wherein each node is a physical machine and/or VM. There may be a plurality of nodes (206) of which a master node (208) is used to manage and/or coordinate as per a container orchestration service (210) such as Kubernetes, Mesos, and/or Docker Swarm.

By contrast to traditionally using Docker Compose to set up an application for a single host or ksonnet to setup an application on Kubernetes, a workflow approach encompasses a "lifecycle management" approach, wherein lifecycle management refers herein to any and/or all operations done to an application in order to maintain an application including:

backing up an application;
restoring an application;
initializing and/or loading data to an application;
implementing a retention policy for an application and/or associated metadata;
scaling up/down an application, for example scaling up/down on demand and/or
automated scaling up/down based at least in part on a resource metric;
updating an application; and/or
changing a database schema.

Portability for a distributed application across execution environments is enabled by this simple lifecycle management for distributed applications across a plurality of containers. An application management service (212), for example implemented at least in part using Kubernetes CustomResourceDefinition (CRD), is used to store workflow definitions and use them to implement a state machine reflective of the distributed application.

Figure 3:
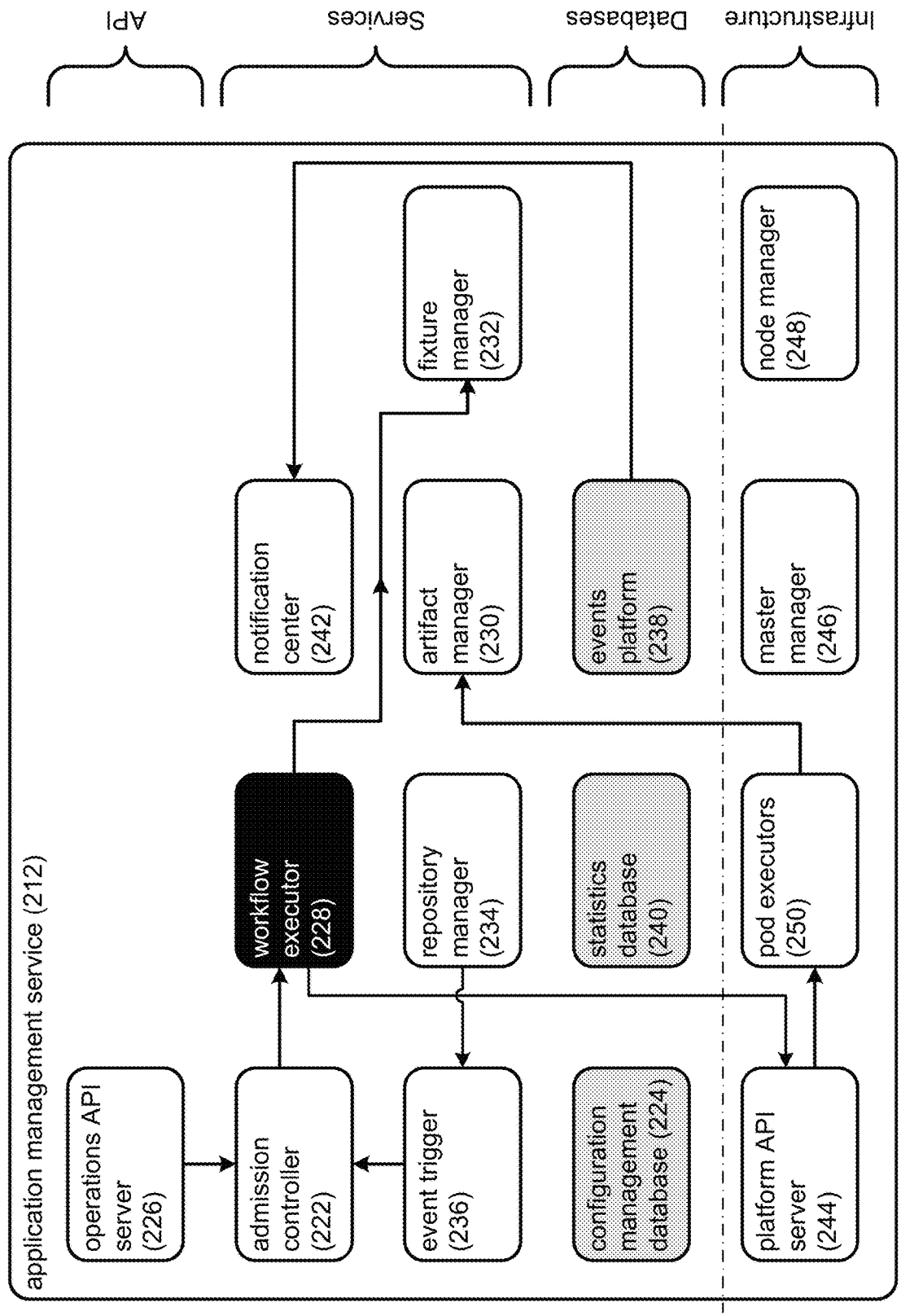
FIG. 3 is a block diagram illustrating an embodiment of a system for application management with control flows.

FIG. 3 is a block diagram illustrating an embodiment of a system for application management with control flows. In one embodiment, the system of FIG. 3 is the application management service (212) of FIG. 2. The control flows are depicted by arrowed lines.

An artifact is a collection of files/directories that may be used as input or output to a step in a workflow, wherein a "file" is a filesystem file and a "directory" is a filesystem directory. Artifacts may be "internal" and/or "intermediate", in which case they may be referenced only within the execution of a particular workflow. Internal artifacts may be automatically garbage collected, for example garbage collected after 7 days. Artifacts may be exported within the system of FIG. 3, and as exported they may be referenced by other workflows. Exported artifacts may also be automatically garbage collected, for example exported artifacts may be garbage collected after 6 months. Artifacts may also be tagged in part to be retained indefinitely, and such tagged artifacts may be manually deleted.

A "fixture" as referred to herein is a service needed to run a workflow. One example of a fixture is a MySQL service needed to run a test. A dynamic fixture may be created automatically by the system of FIG. 3 before executing a workflow by running a specified container that implements the service. A dynamic fixture generally starts in the same state and behaves in the same manner each time it is created. This may ensure that the execution of a workflow that uses the dynamic fixture is deterministic each time it is run. A static fixture may be any service that is registered with the system of FIG. 3, for example a Windows VM running SQL Server or any accessible SaaS service. A static fixture may be placed into a well-known state before it is used. This may ensure that the execution of a workflow that uses the static fixture is deterministic each time it is run. In one embodiment, a static fixture is specified using labels, for example "mem=2mib os=Windows" and/or "db=RDS". A static fixture may be "exclusive" or "shared":

a. An exclusive fixture may only be used by one workflow at a time, thus workflows that need a static fixture may generally wait until it becomes available; and b. A shared fixture may be used by multiple resources concurrently.

A persistent "volume" as referred to herein may be used to store data used by workflows. In one embodiment, anonymous volumes are volumes that exist only within the context of a specific executing workflow, as opposed to named volumes being volumes that exist independently of workflows. Anonymous volumes are generally created to provide temporary storage space for workflows. The content of anonymous volumes are typically not important to the execution of workflows. Named volumes may hold specific data for use by workflows. In some cases, the data on a named volume may remain the same or change between runs of a workflow.

A "secret" as referred to herein is an encrypted string that may be included in templates to avoid exposing secret in source repositories. The secret is then decrypted just prior to when it is used during the execution of a workflow. A set of one or more "configuration parameters" are stored in a database (224) and may be referenced by name from within templates. These configuration parameters avoid having to hardwire parameters in source repositories. As referred to herein, a "policy" template is used to specify automatically triggered workflows. Common "triggers" as referred to herein may include time based triggers, for example triggers based on cron, and triggers based on commits, pull requests, and/or merges to repositorities.

For the system of FIG. 3 and as referred to herein, a "project" is a template used to create a catalog of workflows that may be executed by users. The project template may allow convenient grouping and identification of commonly used workflows. A "repo" is referred to herein as a repository such as a source code repository, for example a git repository and/or a mercurial repository. A repo documents and tracks changes to a set of files and directories over time. A "commit" is referred to herein as a change made to a repo, for example made to a git repository. Changes may be identified using hexadecimal signatures such as ea61c67d. A workflow may be a sequence of steps to be performed on a commit. An "image" is referred to herein as a container image, such as a Docker container image, including a packaged binary that may be run to create a container instance.

The system of FIG. 3 includes services and components. For example, the admission control component (222) delays/limits workflows until there are sufficient resources to run the workflow, at which time it admits work as resources become available. This allows implementation of QoS (Quality of Service) controls in part by deciding which jobs to admit next, and prevents overloading the container orchestrator (210) with too much work that cannot be scheduled. The admission control (222) prevents resource deadlocks when executing complex workflows. The admission control (222) launches one or more (WFE) workflow executors (228) for new workflows and monitors the workflow executors (228)

A configuration management database (224) (CMDB) stores the configuration and operational state of all system component and services including active workflows, fixtures, and so on. An operations API server (226) serves an API to handle YAML verification of workflow definitions, manages state needed by a UI for application management, handles events from the workflow executor (228), and provides miscellaneous and utility logic. In one embodiment, the CMDB (224) includes a configuration, operational, historical, and stats database.

The workflow executor (228) runs a workflow, manages workflow state transitions, and launches new steps. The workflow executor (228) may be part of a workflow execution platform. In one embodiment, one workflow executor (228) service is used per workflow and deployment, and the executor (228) exits after deployment starts. With the implemented state machine, a workflow executor (228) may restarts itself via the container orchestration service (210) and restart failed steps if interrupted, for example if the associated node restarts or reboots. The workflow executor (228) may schedule dynamic fixtures, reserve static fixtures, and/or schedules deployments.

An artifact manager (230) supports querying and searching for artifacts. The artifact manager (230) provides lifecycle management of artifacts, for example the above-mentioned retention policies over 7-days, 6-months, and/or manual deletion only. The artifact manager (230) may query and/or find internal/external artifacts. The artifact manager (230) may serves and/or manage a table of artifacts. The artifact manager (230) may collects and catalog output artifacts.

A fixture manager (232) manages a table of static fixtures and persistent volumes. In one embodiment, the fixture manager (232) manages reservations for fixtures and volumes, for example some fixtures may be shared, while others cannot. The fixture manager (232) may allow the creation of fixtures/volumes.

A repository manager (234) or repo manager is a gateway to a repo such as git. It interfaces using an approval API, and may catch git state. The repository manager (234) may provide a query API for git state for example with commits, branches, commit data, and so on. A "branch" is referred to herein as a branch in a repo such as master or default, wherein each branch represents an alternate timeline of changes that may diverge and/or merge with other branches over time. An event trigger (236) triggers policies, triggers events from webhooks, polls repositories, updates the CMDB (224), and/or submits jobs via the operations API server (226).

An event platform (238) such as Kafka is used to collects events, provide statistics, provide a notification center, and manage workflow executor (228) events. In one embodiment, a statistics database (240) is separate from the CMDB (224) and talks with container advisors such as cAdvisor, and/or sends data to the events platform (238) like Kafka. In one embodiment, Prometheus is used as a statistics database to monitor volume stats, monitor filesystem and block device stats such as capacity and performance, monitor container orchestration data, for example Kubernetes data from cAdvisor, and monitor internal stats.

A notification center (242) processes events from the events platform (238) like Kafka, logs events to the CMDB (224), distribute events according to system/user preferences including UI and/or email notification. In one embodiment, an in-memory data structure store/database like Redis is used for caching and for workflow executor (228) notification.

A platform API server (244) serves as an interface to the container orchestration service (210) like Kubernetes. The platform API server (244) abstracts infrastructure services like Kubernetes, AWS (Amazon Web Services), GCP (Google Cloud Platform), and Microsoft Azure. The platform API server (244) may create and runs orchestration/

Kubernetes specs, monitor the status of jobs and/or deployment, create volumes, modify volumes, and/or delete volumes.

A master manager (246) monitors the health of the container orchestration/Kubernetes master, terminates an unhealthy master, and starts a new orchestration/Kubernetes master in the event of a terminated master. Similarly, a node manager (248) monitors health of all nodes and/or minions. The node manager (248) may terminate/restart unhealthy nodes and/or minions. The node manager (248) may also monitor "spot" pricing of cloud instances, submit bids, and/or switch to "on-demand" instances when prices are high. The node manager (248) may also switch back to spot instances when prices drop. The node manager (248) may regularly monitor and report spot prices for each instance.

A pod executor (250) manages container orchestration units, for example Kubernetes pods. The pod executor (250) may initialize a container, in part by unpacking one or more artifacts, setting up environment variables, and/or replacing a user entrypoint with a wrapper entrypoint, which may perform additional setup, cleanup or coordination operations. The pod executor (250) may manager a user container wrapper, in part by setting up environment variables, invoking a user entrypoint, tarring output artifacts for saving, recording exit status, and informing a wait container that a step is complete. A pod executor may also include a wait container to collect live logs from the container orchestration service (210) like Kubernetes, upload logs and/or artifacts, and report status to a workflow executor (228).

System to Distribute and Execute Distributed Applications.

Figure 4A:
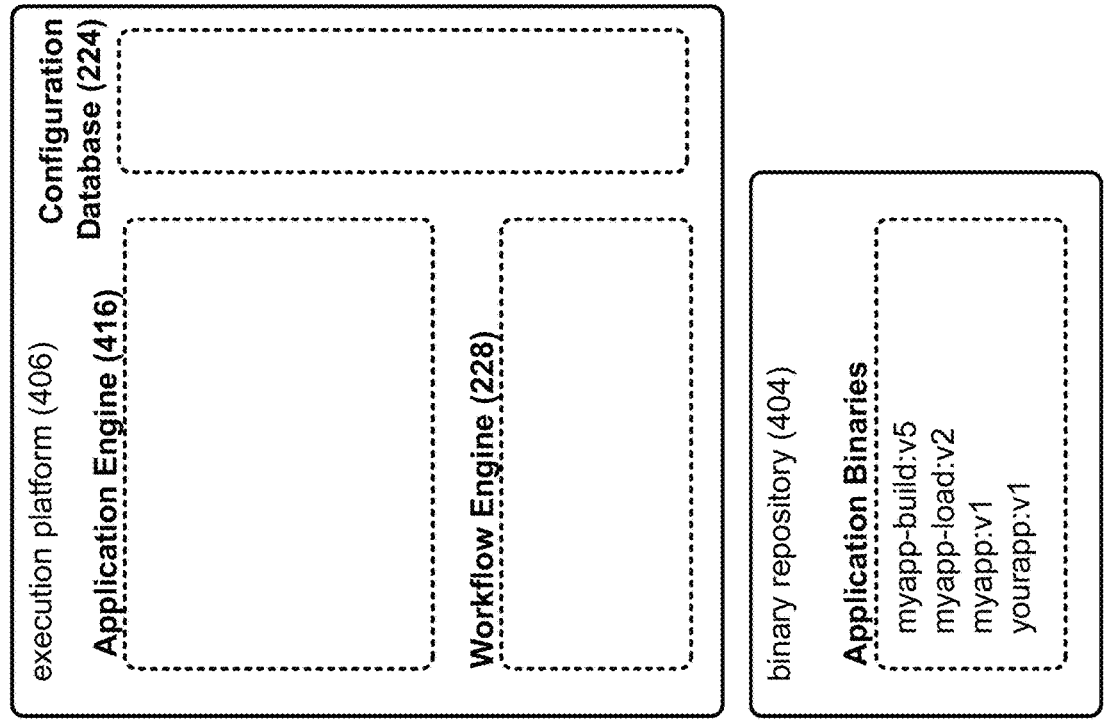
FIG. 4A is an embodiment of a system that allows packaging, distribution and reliable, consistent execution of distributed and/or complex applications in a portable way across execution environments.
Figure 4A:
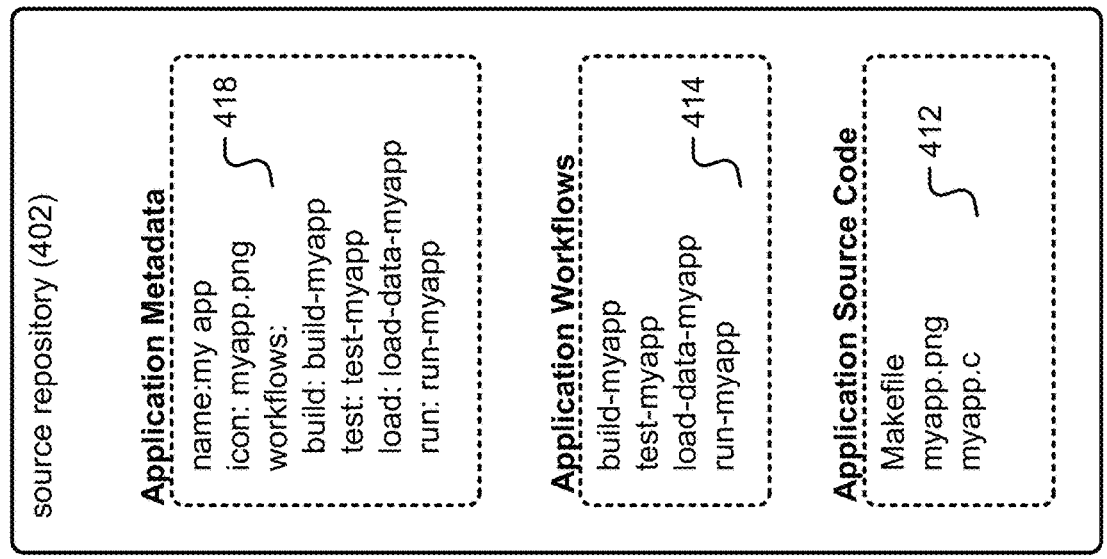

FIG. 4A is an embodiment of a system that allows packaging, distribution and reliable, consistent execution of distributed and/or complex applications in a portable way across execution environments. Such an application may comprise multiple executable components and may require auxiliary workflows for effective use and management of the application.

The system includes a source repo (402), a binary repo (404), and an execution platform (406). Typically, a source code management system such as git may be used for the source repo (402) and an artifact management system such as Nexus as the binary repo (404). The execution platform (406) combines an engine for running workflows (228), an engine for running application objects (416), and a configuration database (224) to manage the application metadata and other state associated with the application.

The source repo (402) stores source code (412) for building binary objects such as executables, images, or other types of derived objects, some of which may be textual in nature such as "Makefile" and "myapp.c". In some cases, the source repo (402) may also store non- source objects such as images like "myapp.png" or executables.

The binary repo (404) stores binary objects including derived objects. A derived object is an object derived from another object, often source code but sometimes other derived objects, by the application of an algorithm, computer program or other process. A derived object may itself be source code, often machine generated. An example of a derived object is "myapp-build:v5" in binary repo (404). The source repo (402) and binary repo (404) may be implemented using existing standard packaging technologies and distribution channels.

The execution platform (406) is a machine for running workflows and executable objects stored in the binary repo (404) based on application metadata (414) and other application state. The execution platform includes a workflow engine (228), an application engine (416), and a configuration database (224).

The execution platform (406) abstracts infrastructure and environmental dependencies, allowing the creation of highly abstract and portable workflows. In the example system, the execution platform (406) distinguishes between two types of executable objects: workflows and applications. A workflow is a source object (414) based on a high-level programming language such as YAML that may be run by the execution platform (228).

An application is generally a non-source object that may be run by the execution platform (406). Examples of non-source objects include executables compiled from source code. Workflows may be run or triggered in many ways including manual user action, programmatically by other workflows or applications, based on time for example with a chron job, or events both internally or externally generated.

In one embodiment, the source repo contains three main types of objects: application metadata (418), workflows (414) and source code (412). In the example system, the application metadata (418) references workflows, the workflows (414) contain directions for building the application from source code (412), storing the resulting executable objects in the binary repo (404), and deploying the application.

These actions may be performed by the execution platform (406) based on the application metadata (418), workflows (414) and source code (412) stored in the source repo (402). Additional instructions and configuration information may also be stored in a separate configuration database. The application itself may be a distributed application consisting of multiple executable objects that coordinate and communicate with each other.

The application metadata (418) defines a set of standard actions or object-oriented interface for interacting with the application. The set of standard actions may be directly presented to the user as an easily accessible menu of available actions or be used by other programs to automate use and management of the application. These standard actions may be mapped to user defined workflows.

Some actions may be specific to a particular application while others may be common across a class of similar applications. The latter may define an interface that other programs can use to programmatically access the application. One of the strengths of workflows is that they provide a high-level language that is easier to use than lower-level languages and provide flexible, powerful coordination of the tasks for managing complex applications.

The creation of an integrated system that combines packaging and distribution of application metadata, workflows, source code, and binary objects with an execution platform that may execute the workflows as well as run the applications allows the creation of portable complex applications that may be run and managed on any instance of such an integrated system. By contrast, traditionally this was not possible due to a wide range of issues including reliance on ad-hoc installation and management scripts that must be customized for each environment and was not portable across execution environments.

Virtualization, for example containerization, provides good encapsulation and portability of simple stand-alone application that may run in a single server. Complex applications such as distributed applications and applications that require access to external services may be difficult to configure and maintain. Traditionally scripting is used to help automate this process, but scripts must often deal with complex infrastructure and environmental variations and do not properly support the full set of required life-cycle management operations such as monitoring, upgrades, loading data, deprovisioning and so on in a portable, consistent, and reliable manner. Complex applications thus are improved by using workflows for installation, configuration and continued management and/or by combining the workflow execution engine with the application execution engine as well as other system components already described for running the application and associated workflows.

In one embodiment, an execution platform (406) provides abstraction of the underlying infrastructure and integration of workflows (414) with the execution platform (406) enables specification of infrastructure independent workflows that may be packaged with the execution objects and application metadata. Together, they enable the creation, distribution and execution of portable complex applications. The packaged application may then be run consistently and reliably on the execution platform (406) specifically designed for this purpose across multiple execution environments.

Figure 4B:
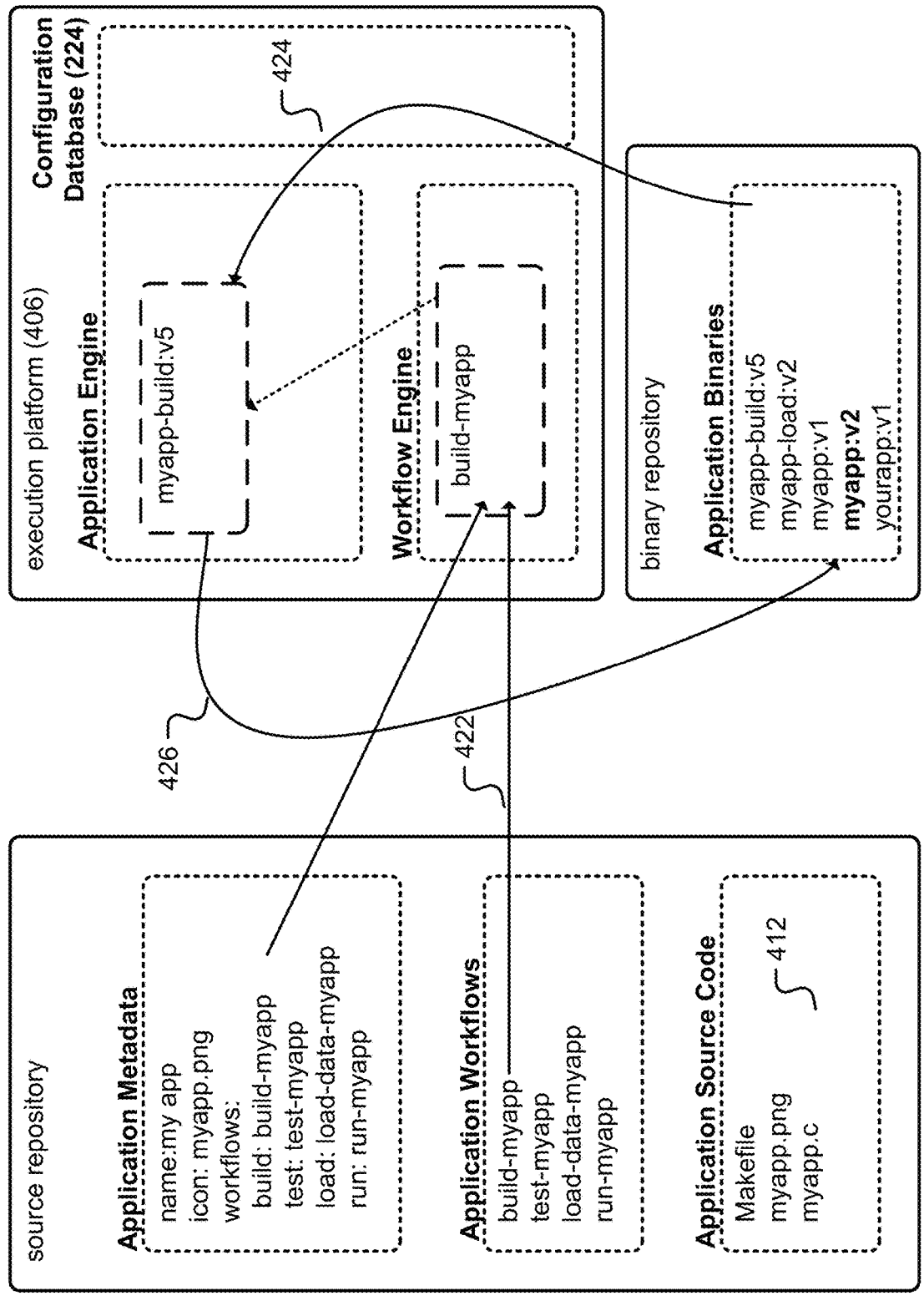
FIG. 4B is an illustration of building an application.

FIG. 4B is an illustration of building an application. To build the distributed application, the execution platform (406) runs the build-myapp workflow (422), which causes the execution platform (406) to run the myapp-build:v5 executable (424), which builds the source code (412) and generates the myapp:v2 executable (426), and stores the executable (426) in the binary repo (404).

Figure 4C:
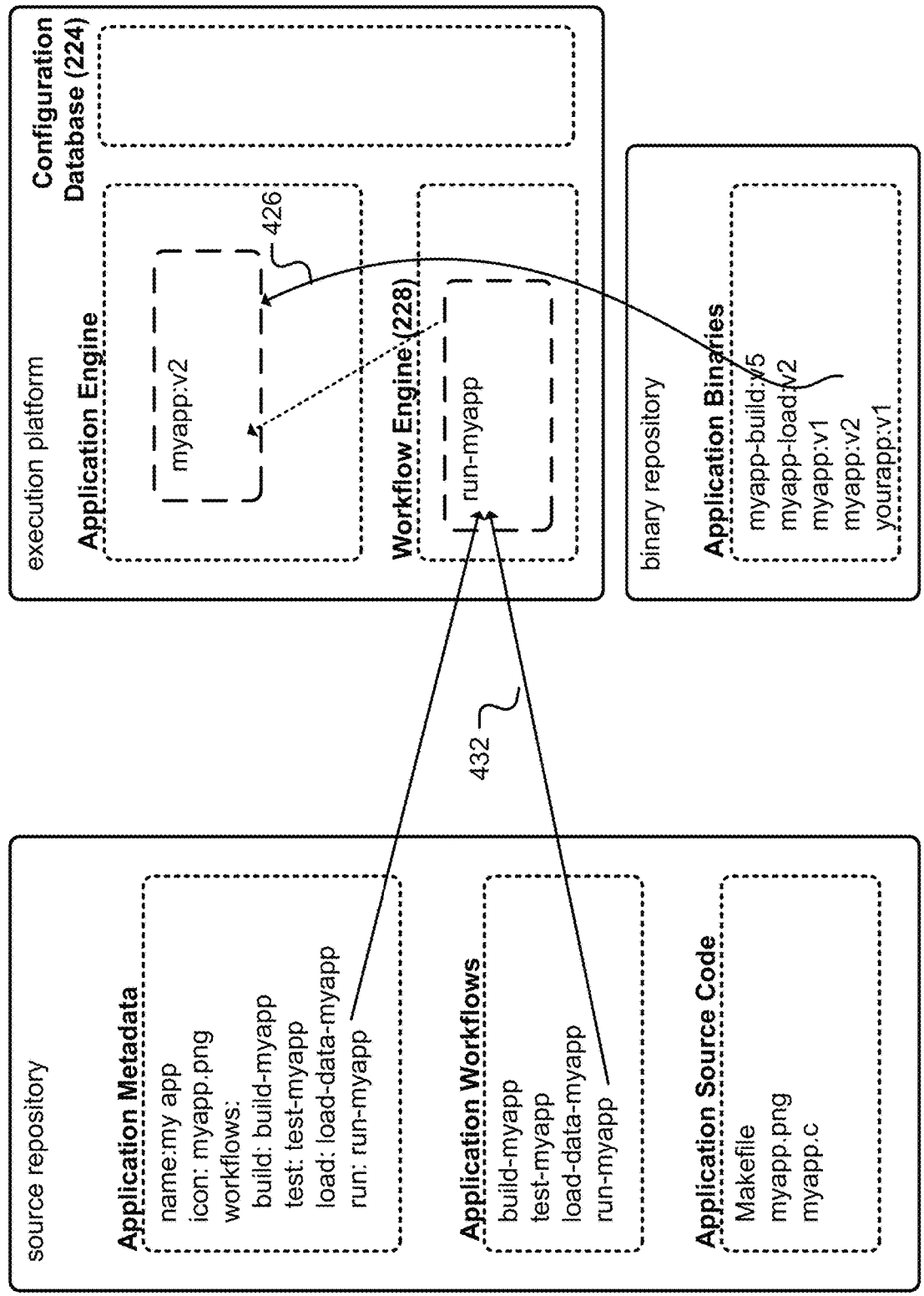
FIG. 4C is an illustration of running an application.

FIG. 4C is an illustration of running an application. To run the application, the workflow engine (228) runs the run-myapp workflow (432), which causes the execution platform to run the myapp:v2 executable (426). In some cases, the run workflow may run many executables in complex sequences and start up multiple sub-applications that together compose the desired complex application.

Figure 4D:
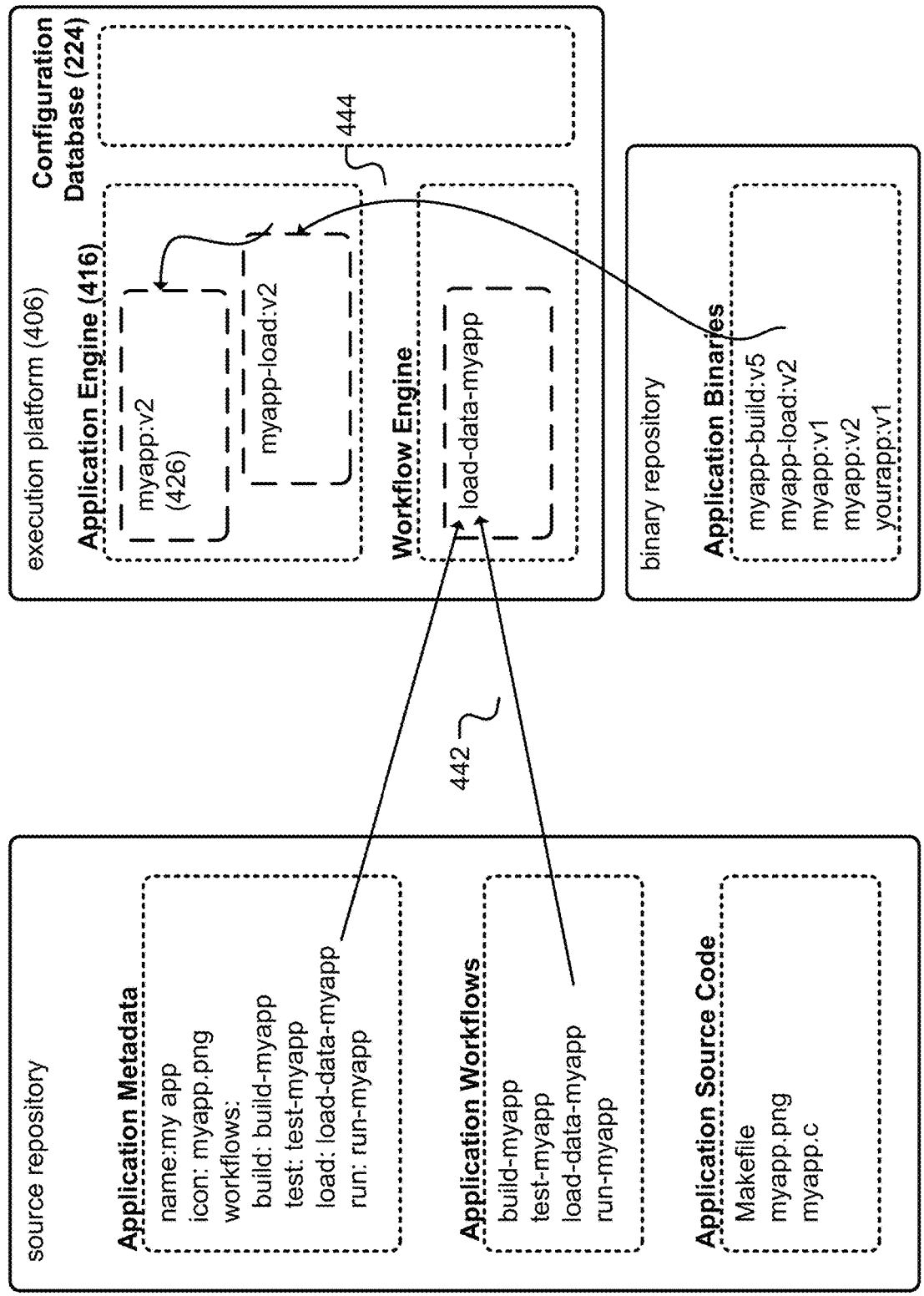
FIG. 4D is an illustration of modifying a running application.

FIG. 4D is an illustration of modifying a running application. To load data into the running application, the application engine (416) runs the load-data-myapp workflow (442), which causes the execution platform (406) to run the myapp-load:v2 (444) executable object, which causes the data to be loaded into the myapp:v2 application (426).

Workflow Service YAML Specification

A detailed description of how workflows are specified comprises in one embodiment describing the YAML format that serves as the DSL for workflows and policies.

Overview

In one embodiment, workflows and policies are specified as YAML documents and checked into source control, for example git. Workflows and policies behave like code and may be treated as code. The workflows may call each other like functions. They may change and drift apart in different branches, and be made consistent again when merged back to the master branch. In one embodiment, a syntax and consistency checker is provided to validate the YAML code.

EXAMPLES

A simple example demonstrates some of the capabilities of the service.

Service that Runs a Container.

The following is a simple service that checks out source code. It uses the axscm:v1 docker image in the private get.applatix.io repository, and runs the axscm command to checkout the code to the /src directory inside the container. The repo and commit parameters are provided by the GUI session, and the code in /src is exposed as an artifact called code.

```
---
name: axscm-checkout
type: container
description: Checks out a source repository to /src container:
    resources:
        mem_mib: 256
        cpu_cores: 0.1
    image: get.applatix.io/applatix/axscm:v1
    command: "axscm clone %%repo%%/src --commit %%commit%%"
inputs:
    parameters:
        commit:
            default: "%%session.commit%%"
        repo:
            default: "%%session.repo%%"
outputs:
    artifacts:
        code:
            path: "/src"
labels:
    release: 1.0.1
    milestone: m5
```

The next example describes a service that may perform a build. This service may need an input artifact from another step in the parent workflow. This artifact may be unpacked to the path /src inside the container before it begins execution. Finally, a supplied CMD may be executed to perform the build.

```
---
name: golang-example-base
type: container
description: golang example base container
container:
    resources:
        mem_mib: 256
        cpu_cores: 0.1
    image: "get.applatix.io/applatix/golang:1.6"
    command: "%%CMD%%"
inputs:
    artifacts:
        - from: "%%code_artifact%%"
          path: "/src"
    parameters:
        CMD:
        code_artifact:
```

A Simple Workflow.

The following example is a workflow that performs a checkout followed by a build of the checked out source code. CMD is a build command that may be run to perform the build. The build step's code artifact is passed in as the %%code_artifact%% so that the build step can access the artifacts generated by the checkout step.

```
---
name: golang check and build
type: workflow
description: golang example workflow that does checkout and build
```

```
inputs:
  parameters:
    commit:
      default: "%%session.commit%%"
    repo:
      default: "%%session.repo%%"
steps:
- checkout:
    template: axscm-checkout
- build:
    template: golang-example-base
    parameters:
      CMD: "sh -c 'cd /src && go build main.go'"
      code_artifact: "%%steps.checkout.code%%"
labels:
  release: 1.0.2
  milestone: m6
```

A Simple Deployment.

The following example is a deployment for Apache Web Server.

```
---
type: deployment
name: apache-example
description: apache deployment example
inputs:
  parameters:
    code:
      default: "%%session.artifacts%%"
    appname:
      default: "test-app"
    deployname:
      default: "test-deploy"
application:
  name: "%%appname%%"
deployment:
name: "%%deployname%%"
scale:
  min: 2
external_routes:
- name: "web-external"
  dns_prefix: "apache"
  dns_domain: "app.applatix.net"
  target_port: 80
  redirect_http_to_https: true
  ip_white_list:
  - 0.0.0.0/0
internal_routes:
- name: "web-internal"
  ports:
  - name: http
    port: 80
    target_port: 80
containers:
- server:
    template: deployment-container
    parameters:
      PROBE_CMD: sh-c 'ls-l /src'
termination_policy:
  time_seconds: "43200"
  spending_cents: "100"
---
type: container
name: deployment-container
container:
  resources:
    mem_mib: 750
    cpu_cores: 0.3
  image: "httpd:latest"
docker_options:
readiness_probe:
  exec:
    command: "%%PROBE_CMD%%"
  initial_delay_seconds: 30
  timeout_seconds: 5
liveness_probe:
  exec:
    command: "%%PROBE_CMD%%"
  initial_delay_seconds: 30
  timeout_seconds: 5
inputs:
  artifacts:
  - from: "%%code%%"
    path: "/src"
  parameters:
    code:
    PROBE_CMD:
      default: sh-c 'ls-l /src'
labels:
  "release": "M7"
```

A Simple Policy.

The following example is a policy that triggers golang check and build on several events.

```
type: policy
name: Sample Policy
description: Sample Policy to trigger golang example
template: golang check and build
parameters:
# parameters with "%%session.*%%" as default value can be fulfilled
# automatically, others
# need to be specified in this section notifications:
# multiple notification can be sepecified
-
  when:
  # options: on_start, on_success, on_failure, on_change
  - on_start
  - on_success
  - on_failure
  whom:
  # options: committer, author, email address, user label
  - committer
  - author
  - abc@company.com
-
  when:
  - on_change
  whom:
  - abc@company.slack.com
when:
multiple triggers can be specified
-
  # options: on_push, on_pull_request, on_pull_request-
    _merge, on_cron
  event: on_push
  target_branches:
  # target_branches are in regular expression format, eg.
    ".*" matches all
  branches
  - "master"
  - "dev.*"
-
  event: on_pull_request
  target_branches:
  - ".*"
```

```
    event: on_pull_request_merge
    target_branches:
    - ".*"
  -
    event: on_cron
    target_branches:
    - ".*"
    # cron expression
    # 0 1 * * *
    # | | | | |
    # | | | | |
    # | | | | +---- Run every day of the week
    # | | | +------ Run every month of the year
    # | | +-------- Run every day of the month
    # | +---------- Run at 1 Hour (1 AM)
    # +------------Run at 0 Minute schedule: "0 */2 * * *"
    timezone: "U.S./Pacific"
labels:
  release: 1.0.2
  milestone: m6
```

A Simple Project.

The following example is a project for golang.

```
---
type: project
name: Sample Project
description: Sample Project to launch golang example
template: golang check and build
actions:
# list of actions that can be launched
-
  name: build
  template: golang check and build
  parameters:
    repo: "https://github.com/Applatix/appstore.git"
  assets:
    icon: "/sample/sample.png"
    detail: "/sample/detail.md"
  categories: ["language", "promoted"]
  # whether the project will be visible on the app store.
  # Project is visible on the app store if at least one
  # branch criteria matches.
  publish:
    branches:
    # branches are in regular expression format,
    # eg. ".*" matches all branches
    -master
    -r.*
  labels:
    release: 1.0.2
    milestone: m6
```

DSL Spec

Service Template

A service template may have the following sections.

Common Name and Type.

name: a unique name of the object.

type: container, workflow, policy, deployment, project description: optional, describes the object for the benefit of the users.

Inputs

There may be two categories of inputs, including the parameters and the artifacts.

parameters: a map of parameter name to parameter object mapping. Each parameter may be used in the YAML body in the form of %%parameter name%% to be replaced with the parameter value at run time.

Parameter object may have the following fields.

default: a default value of the parameter. Optional: If a default value is specified and the user did not provide a value when launching a service instance, the default value may be used.

description: optional, a description for the benefit of the users of the service.

artifacts: an array of artifact objects. Each input artifact may be placed at a specified path.

Artifact object has the following fields.

path: the absolute path inside the container where this artifact may be placed.

from: where the artifact comes from. The common pattern is in the form of %%xxx_artifact%% where %%xxx_artifact%% is passed in as a parameter from the parent workflow.

Outputs.

In one embodiment, artifact outputs are supported.

artifacts: a map of unique output artifact name to artifact object mapping.

Artifact objects has the following fields.

path: the absolute path inside a container that may be exported as artifact.

excludes: an array of file name patterns that are excluded from the artifact collection. The pattern is in the form of a tar pattern.

Container.

This section describes a container, for example a Docker container.

image: the docker container image, similar to that provided for a docker pull.

command: a string that specifies the command to run in the container.

docker_options: the container options. In one embodiment, "-e" and "-p" options are supported, although the use of "-p" is strongly discouraged as it limits the migratability of the container.

resources: the system resource the container is allowed to use.

mem_mib: amount of memory in MiB the service is expected to use. In one embodiment, this service is only run on a host with that much free memory. In the event the service's memory grows beyond 1.5× of specified amount, it may be killed.

cpu_cores: the percentage of a cpu core the service is allowed to use, 0.1 meaning 10% of a single core. In one embodiment, the service is capped to use up to 4× of the specified amount. In one embodiment, the service is not killed for exceeding a cpu limit.

Steps

This section describes the steps in a workflow. In one embodiment, steps are mutually exclusive to the container section. A workflow only uses other containers and workflows, and may not define a container itself A workflow may contain any number of steps in an array. The steps may be executed in sequence, and if one step fails, the workflow may be considered failed and abort the steps following.

Each step may also contain multiple tasks, which may be run in parallel. If any one of them fails, the others in the same step may still execute to completion, but the overall step may be considered failed.

The steps section contains

An array of step objects. Each step object contains

A map of task name to task object mapping. The task name must be unique within the whole workflow, not just within the step.

The task object contains the following fields.
- template: the name of the service template this task runs.
- parameters: it's a map of parameter name to value mapping. The parameter names are as defined in the service template.

Exception Handling.

In many cases, there is a need to specially handle errors and exceptions that occur during workflows. Two special flags are provided for this purpose: ignore_error: Ignore any errors/failures for the specified step. The step always succeeds. always_run: Always run this step before exiting the current sequence of steps.

Below, the cleanup step may always be run even if the job fails or is canceled during the setup or test phase. Furthermore, any errors during the cleanup step will be ignored and cannot fail the workflow.

---
steps:
- setup:
    template: mysetup
- test:
    template: mytest
- cleanup:
    template: mycleanup
    flags:
      always_run: true
      ignore_error: true Fixtures.

This section defines the fixtures that a service can launch or reserve. There are two types of fixtures: static and dynamic.

static—static fixtures may be externally managed resources which are requested and reserved during a portion of a workflow. Static fixtures may be input into the system through a UI, along with user defined attributes. A typical use case for static fixtures would be to have a pool of hosts or VMs in which tests require exclusive access to during execution. Upon completion of the workflow, the reserved fixtures may be released back into the pool to be used by other workflows.

dynamic—dynamic fixtures are containers that run alongside all steps of a workflow.

Dynamic fixtures are different from a regular task in the sense that its life spans the whole service that runs it. Typically a dynamic fixture would not exit on its own, and may be shut down by the framework (212) at the end of the service that uses the fixture.

The fixture section is structure similar to the steps section.

An array of fixture steps for execution. They are run in sequence. Each step contains:
- A map of fixture name to fixture object. The fixture name may be unique within the workflow.
- A dynamic fixture object may comprise the following:
  - template: (may be required) the name of the service template that this fixture runs.
  - parameters: the map of name, value pairs to satisfy the above template's parameter requirements.
  - probe: an optional http REST endpoint that the fixture can expose to let the workflow engine that it is ready. Once specified, the workflow engine may poll http://:/, and will only proceed when it returns HTTP status 200.
    - port: the port the endpoint runs on.
    - path: the URL path the endpoint responds to.
- A static fixture object containing a map of requirements to be requested during workflow execution:
  - category: the category name to request
  - name: the name of a specific fixture
  - attributes: a map of one or more fixture attributes to request (e.g. os_vendor: "Ubuntu")

Below is an example of a test using a mongodb dynamic fixture. For simplicity the container definition of the mongodb-fixture or mogodb-loadgen service templates is not included.

name: mongodb-test-workflow
type: workflow
fixtures:
- mongodb_fixture:
    template: mongodb-fixture
steps:
- mytest:
    template: mogodb-loadgen parameters:
      db_address: "%%fixtures.mongodb_fixture.ip%%"

Below is an example of a test requesting a static fixture, specifically requesting a Linux host running Ubuntu 16.04. The Linux category, and attributes os_vendor, os_version, hostname are all user defined attributes that have been input into the system via a GUI.

name: linux-test-workflow
type: workflow
fixtures:
- linux_fixture:
    category: Linux
    attributes:
      os_vendor: Ubuntu
      os_version: 16.04
steps:
- mytest:
    template: linux-test
    parameters:
      hostname: "%%fixtures.linux_fixture.hostname%%"

Parameter Special Values.

The parameters, for example for static fixtures, may have the following special values:
- %%session.commit%%—the commit that the user selected on the UI
- %%session.repo%%—the repo for the above commit
- %%steps.%%—the step identified by name
- %%steps. . . ip%%—the IP address of the service associated with the step
- %%steps . . . %%—the artifact called "artifact name" generated by the step
- %%fixtures.%%—the fixture identifed by name
- %%fixtures . . . ip%%—the fixture's IP address Deployment In one embodiment, a deployment template is the orchestration spec for a long running service. It includes the additional sections to provide the information about the route, scale, etc. In one embodiment, all the names may be compiled with the following pattern: ^([a-z0-9]([-a-z0-9]*[a-z0-9])?)$ Common Name and Type
name: the unique name of the object.
type: deployment.
description: optional, describes the object for the benefit of the users.
type: deployment
name: apache-example
description: apache deployment example Application.

Application is the group concept of deployments. With the same application, deployments may use an internal route to communicate with each other.

name: the unique name of the object.
application:
name: "%%appname%%"
Deployment.
A unique deployment name is usually required.
name: the unique name of the object.
deployment:
name: "%%deployname%%"
External_Routes.
An external route is the route for deployment to be exposed to the Internet and/or other network.
name: the unique name of the object within application.
dns_prefix: the DNS name prefix to the domain. The default is
{RouteName}-{DeploymentName}-{Application-Name}.
dns_domain: the DNS domain. The domain may be managed by a service, for example AWS Route 53. The cluster domain configuration may be updated before using any domain.
target_port: the instance port to be exposed.
redirect http_to_https: indicate whether to redirect all the http traffic to https.
ip_white_list: the white CIDR list for security control.
external_routes:
name: "web-external"
dns_prefix: "apache"
dns_domain: "app.applatix.net"
target_port: 80
redirect_http_to https: true
ip_white_list:
- 0.0.0.0/0
Internal_Routes.
An internal route is the route for deployment to be exposed within the cluster.
name: a unique name of the object within application.
ports: the list of ports to be exposed.
name: a unique port name within the deployment.
port: the incoming port, such that other deployments may reach this deployment with this port number.
target_port: the internal port to be exposed.
internal_routes:
- name: "web-internal"
ports:
- name: http
port: 80
target_port: 80
Scale.
A scale section describes the number of replicas/instances for the deployment. A load balancer may be created automatically to load balance among instances when route is configured.
scale:
min: 2
Containers.
This section describes containers to be included in the deployment. The template may be a container type service template. The container script may ensure it is long running, otherwise the container may be rescheduled every time it finishes. One or more containers in a single deployment instance may be supported.

containers:
- server:
template: deployment-container
parameters:
PROBE_CMD: sh -c 'ls -1 /src'
Termination_Policy.
Both time and spending limit may be specified for the deployment by filling up the termination policy section.
termination_policy:
time_seconds: 43200
spending_cents: 100
Policy.
A policy has the following sections.
Follow the steps to enable a policy in a branch:
Making sure the policy when target_branches may match the branch name.
Enable the policy from the Policies Page.
Common Name and Type
name: the unique name of the object.
type: policy.
description: optional, describes the object for the benefit of the users.
template: the template name
---
type: policy
name: Sample Policy
description: Sample Policy to trigger golang example
template: golang check and build
Parameters
Parameters with "%%session.commit%%" or "%%session.repo%%" as default value may be fulfilled automatically, and do not need to necessarily be specified
Others may be specified in this section to fulfill the template parameters section
Notifications
notifications:
multiple notification can be sepecified
-
when:
options: on_start, on_success, on_failure, on_change
- on_start
- on_success
- on_failure
whom:
options: committer, author, email address, user label
- committer
- author
- abc@company.com
-
when:
- on_change
whom:
- abc@company.slack.com
Notification is made of two parts:
when specifies the list of job event to notify, options comprising: on_start, on_success, on_failure, on_change
whom specifies the list of destination to notify, options comprising: committer, author, email address, user label
Multiple notification may be specified
When
when:
multiple triggers can be specified
options: on_push, on_pull_request, on_pull_request_merge, on_cron
event: on_push

```
target_branches:
  # target_branches are in regular expression format, eg.
      ".*" matches all branches
  - "master"
  - "dev.*"
-
  event: on_pull_request target_branches:
  - ".*"
-
  event: on_pull_request_merge
  target_branches:
  - ".*"
-
  event: on_cron
  target_branches:
  - ".*"
  # cron expression
  # 0 1 * * *
  # | | | | |
  # | | | | |
  # | | | | +---- Run every day of the week
  # | | | +------ Run every month of the year
  #| | +-------- Run every day of the month
  # | +---------- Run at 1 Hour (1AM)
  # +------------ Run at 0 Minute
    schedule: "0 */2 * * * " timezone: "US/Pacific"
``` when has different event types, and for many events, target_branches are required and in regular expression format:

on_push: trigger on the SCM push event
on_pull_request: trigger on the pull request creation/update
on_pull_request_merge: trigger on the pull request merge
on_cron: trigger on the cron schedule, schedule is required, timezone is optional Project A project has the following sections.
Common Name and Type
name: a unique name of the object.
type: project.
description: optional, describes the object for the benefit of the users.

```
---
type: project
name: Sample Go Project
description: Sample Project to launch golang example
template: golang check and build
```

Actions.

One or more entry points to a project. Each entry point may be a reference to an existing template. An action contains
name: action name unique in the project
template: template to launch
parameters: optional, parameters to launch the template. The parameters may exist in the template. Parameter values defined override the default values specified in the template.

```
actions:
-
  name: build
  template: golang check and build
  parameters:
    repo: "https://github.com/Applatix/appstore.git"
```

Assets.

Project assets may be used by an app store and include icon and detail description of the project.
icon: optional, path to the icon file for the project. File types like .png may be supported
detail: optional, path to a mark down that provides details for the project

```
assets:
  icon: "/sample/sample.png"
  detail: "/sample/detail.md"
```

Categories.

List of categories under which the project may appear on an app store.

```
categories: ["language", "promoted"]
```

Publish.

Zero or more criteria for publishing a project to an app store. Only published projects are visible on the app store.

```
publish:
  # publish is based on branches
  branches:
  # branches are in regular expression format,
  # eg. ".*" matches all branches
    -master
    -r.*
```

Figure 5:
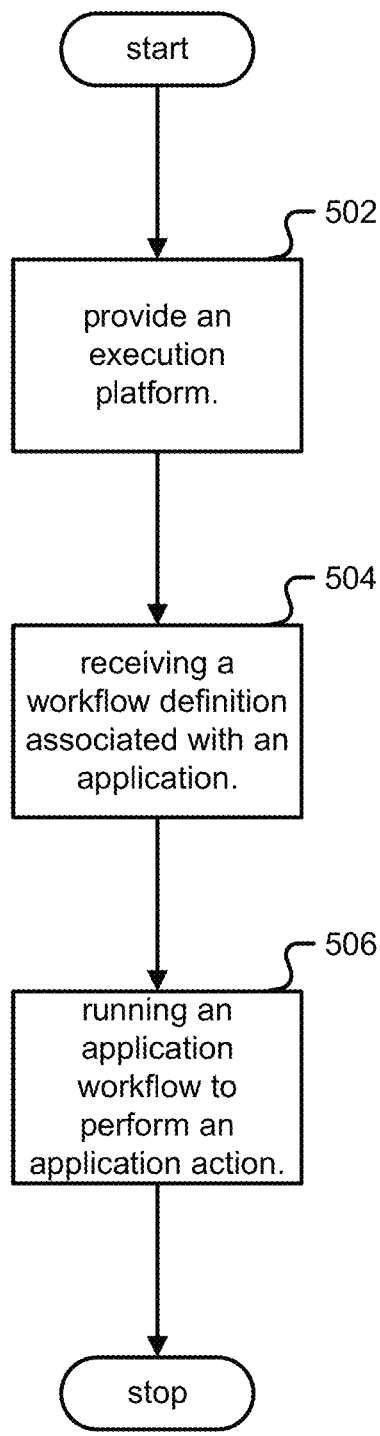
FIG. 5 is a flow chart illustrating an embodiment of a process for running an application workflow.

FIG. 5 is a flow chart illustrating an embodiment of a process for running an application workflow. In one embodiment, the process of FIG. 5 is carried out by application management service (212) for FIG. 2B and/or the system shown in FIGS. 4A-D.

In step 502, an execution platform (406) is provided comprising a workflow engine (228) and an application engine (416). In one embodiment, the application is a containerized application and the workflow definition is packaged with an application definition (418), (414), (412). In one embodiment, the application definition comprises an application metadata (418). In one embodiment, the application metadata comprises at least one of the following: an application workflow (414) and an application source code (412). In one embodiment, the workflow engine (228) is computing platform agnostic, for example associated with a container technology.

In one embodiment, the workflow definition is computing platform agnostic. For example, the workflow definition may be defined in a portable manner using YAML and/or another portable language. In one embodiment, the workflow engine (228) is a service or other extension of the execution platform (406). In one embodiment, the service (228) is a Kubernetes service associated at least in part with a CustomResourceDefinition (CRD). In one embodiment, the workflow engine (228) is platform agnostic by nature of Kubernetes or another deployment regime.

In one embodiment, the application is a complex, multi-component, distributed application. In one embodiment, workflows provide at least one of the following: automated building, automated deployment, automated management of components, automated adding of new services. In one embodiment, workflows provide an automated scale up of the complex, multi-component, distributed application. In one embodiment, the automated scale up of the complex, multi-component, distributed application is based at least in part on demand.

In step 504, a workflow definition associated with an application is received. In one embodiment, the workflow definition is expressed in a higher level language. In one embodiment, the higher level language is a markup language. In one embodiment, the markup language is YAML.

In step 506, the workflow definition is used to run an application workflow (414) to perform an action with respect to the application, at least in part by causing an executable binary (404) to be run by the application engine (416). In one embodiment, the action is at least one of the following: a build action, a test action, a run action, a load data action, an initialize data action, a retention policy action, a scale up action, a scale down action, an update action, a change database schema action, a backup action, a restore action, and a lifecycle management action. In one embodiment, the action comprises causing a binary to be generated. In one embodiment, the action also comprises storing the binary in a binary repository (404).

In one embodiment, the system processes an artifact, for example including using the workflow definition to capture the artifact of a specified operation. In one embodiment, processing the artifact includes using the workflow definition to store the artifact of a specified operation. In one embodiment, processing the artifact includes using a second workflow definition with the artifact to perform a second operation, for example a workflow definition A may capture/store an artifact of operation X, and later a workflow definition B may use said artifact to do Y.

In one embodiment, a CMDB (224) is used and/or interfaced with. In one embodiment, the CMDB stores configuration information for a workflow, for example the configuration information may be used to customize workflows for a particular execution environment. In one embodiment, the CMDB stores operational information about a workflow, for example the operational information may comprise at least one of the following: workflow state, status, historical, and monitoring information. In one embodiment, the operational information is generated by a workflow. In one embodiment, the operational information is used to modify the execution of a workflow.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a communication interface; and
    a processor coupled to the communication interface and configured to:
        provide an execution platform comprising a workflow engine and an application engine;
        receive via the communication interface a first workflow definition defining a first application workflow associated with an application; and
        execute the first application workflow with the workflow engine, wherein the first application workflow is configured to cause the application engine to:
            retrieve a first executable binary from a binary repository, wherein the first executable binary is configured to build an application binary for the application;
            retrieve source code for the application binary from an application source code repository;
            execute the first executable binary;
            build the application binary based on the retrieved source code;
            store the application binary in the binary repository;
        receive via the communication interface a second workflow definition defining a second application workflow associated with the application; and
        execute the second application workflow with the workflow engine, wherein the second application workflow is configured to cause the application engine to:
            retrieve the application binary from the binary repository; and
            execute the application binary in order to run the application;
        receive via the communication interface a third workflow definition defining a third application workflow associated with the application; and
        execute the third application workflow with the workflow engine, wherein the second application workflow is configured to cause the application engine to:
            retrieve a second executable binary from the binary repository; and
            execute the second executable binary, wherein executing the second executable binary modifies the running application binary.

2. The system of claim 1, wherein the second application workflow is further configured to cause the application engine to:
    retrieve a plurality of executable binaries from the binary repository; and
    execute the plurality of executable binaries in sequence.

3. The system of claim 1, wherein the processor is further configured to execute the application binary in a container.

4. The system of claim 1, wherein the system further comprises:
    a node manager configured to monitor and reboot nodes; and
    a plurality of nodes monitored by the node manager,
    wherein the workflow engine is further configured to cause the system to:
        run the first application workflow on a first node of the plurality of nodes; and
        restart at least one step of the first application workflow if the first application workflow is interrupted by the node manager rebooting the first node.

5. The system of claim 1, wherein the processor is further configured to:
    retrieve an application workflow customization from a configuration management database (CMDB); and
    customize the first application workflow based on the first application workflow's execution environment.

6. The system of claim 1, wherein the first workflow definition comprises YAML code.

7. The system of claim 1, wherein the workflow engine comprises a Kubernetes service.

8. The system of claim 1, wherein the first application workflow is further configured to cause the workflow engine to run a second application workflow.

9. A method, comprising:
    providing an execution platform comprising a workflow engine and an application engine;
    receiving via a communication interface a first workflow definition defining a first application workflow associated with an application; and
    executing, by the workflow engine, the first application workflow;
    retrieving, by the application engine, a first executable binary from a binary repository, wherein the first executable binary is configured to build an application binary for the application;
    retrieving, by the application engine, source code for the application from an application source code repository;

executing, by the application engine, the first executable binary;

building, by the application engine, the application binary based on the retrieved source code;

storing, by the application engine, the application binary in the binary repository;

receiving via the communication interface a second workflow definition defining a second application workflow associated with the application; and executing, by the workflow engine, the second application workflow;

retrieving, by the application engine, the application binary from the binary repository;

executing, by the application engine, the application binary in order to run the application;

receiving via the communication interface a third workflow definition defining a third application workflow associated with the application; and executing, by the workflow engine, the third application workflow;

retrieving, by the application engine, a second executable binary from the binary repository; and executing, by the application engine, the second executable binary in order to modify the running application.

10. The method of claim 9, further comprising:
retrieving, by the application engine, a plurality of executable binaries from the binary repository; and
executing, by the application engine, the plurality of executable binaries in sequence.

11. The method of claim 9, further comprising executing, by the application engine, the application binary in a container.

12. The method of claim 9, wherein:
the workflow engine is executed on a first node of a plurality of nodes monitored by a node manager, and
the method further comprises: restarting, by the workflow engine, at least one step of the first application workflow after the first application workflow is interrupted by the node manager rebooting the first node.

13. The method of claim 9, further comprising:
retrieving an application workflow customization from a configuration management database (CMDB); and
customizing the first application workflow based on the first application workflow's execution environment.

14. The method of claim 9, wherein the first workflow definition comprises YAML code.

15. The method of claim 9, wherein the workflow engine comprises a Kubernetes service.

16. The method of claim 9, wherein the first application workflow is further configured to cause the workflow engine to run a second application workflow.

17. A non-transitory computer-readable medium comprising instructions that, when executed by a processor of a processing system, cause the processing system to perform a method, the method comprising:
providing an execution platform comprising a workflow engine and an application engine;
receiving via a communication interface a first workflow definition defining a first application workflow associated with an application; and
executing, by the workflow engine, the first application workflow;

retrieving, by the application engine, a first executable binary from a binary repository, wherein the first executable binary is configured to build an application binary for the application;

retrieving, by the application engine, source code for the application from an application source code repository;

executing, by the application engine, the first executable binary;

building, by the application engine, the application binary based on the retrieved source code;

storing, by the application engine, the application binary in the binary repository;

receiving via the communication interface a second workflow definition defining a second application workflow associated with the application; and executing, by the workflow engine, the second application workflow;

retrieving, by the application engine, the application binary from the binary repository;

executing, by the application engine, the application binary in order to run the application;

receiving via the communication interface a third workflow definition defining a third application workflow associated with the application; and executing, by the workflow engine, the third application workflow;

retrieving, by the application engine, a second executable binary from the binary repository; and executing, by the application engine, the second executable binary in order to modify the running application.

18. The non-transitory computer-readable medium of claim 17, wherein the method further comprises:
retrieving, by the application engine, a plurality of executable binaries from the binary repository; and
executing, by the application engine, the plurality of executable binaries in sequence.

19. The non-transitory computer-readable medium of claim 17 wherein the method further comprises executing, by the application engine, the application binary in a container.

20. The non-transitory computer-readable medium of claim 17, wherein:
the workflow engine is executed on a first node of a plurality of nodes monitored by a node manager, and
the method further comprises: restarting, by the workflow engine, at least one step of the first application workflow after the first application workflow is interrupted by the node manager rebooting the first node.

21. The non-transitory computer-readable medium of claim 17, wherein the method further comprises:
retrieving an application workflow customization from a configuration management database (CMDB); and
customizing the first application workflow based on the first application workflow's execution environment.

22. The non-transitory computer-readable medium of claim 17, wherein the first workflow definition comprises YAML code.

23. The non-transitory computer-readable medium of claim 17, wherein the workflow engine comprises a Kubernetes service.

24. The non-transitory computer-readable medium of claim 17, wherein the first application workflow is further configured to cause the workflow engine to run a second application workflow.

* * * * *